Nov. 2, 1965   B. F. MIESSNER   3,215,765
FIXED-FREE-REED ELECTRONIC PIANO WITH IMPROVED
INTER-PARTICAL-RATIO INTEGRALIZING
ARRANGEMENTS
Filed Dec. 18, 1962   2 Sheets-Sheet 1
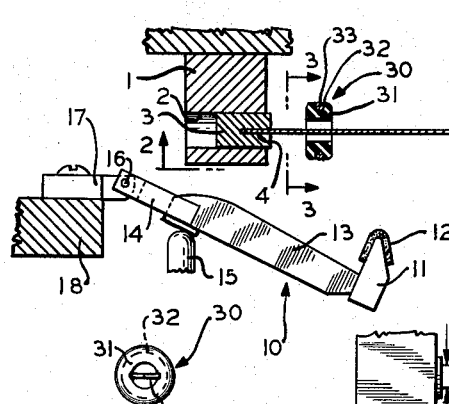
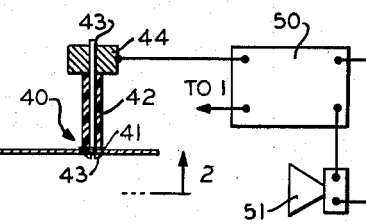
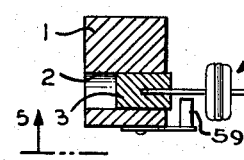
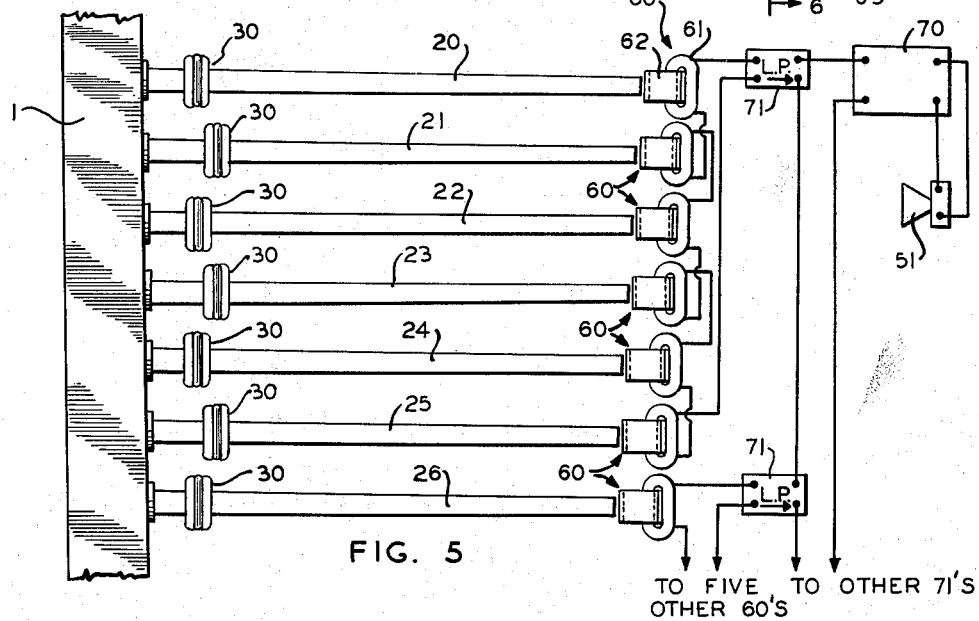
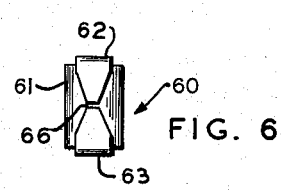
INVENTOR.
BENJAMIN F. MIESSNER
BY
ATTORNEY

*INVENTOR.*
BENJAMIN F. MIESSNER

ATTORNEY 3,215,765
FIXED FREE-REED ELECTRONIC PIANO WITH IMPROVED INTERPARTIAL-RATIO INTEGRALIZING ARRANGEMENTS
Benjamin F. Miessner, Miami Shores, Fla., assignor to Miessner Inventions, Inc., Miami Shores, Fla., a corporation of New Jersey
Filed Dec. 18, 1962, Ser. No. 245,599
14 Claims. (Cl. 84—1.06)

This invention relates to an Electronic Piano of the general type disclosed by me in U.S. Patent 2,942,512, i.e., wherein for each note there is employed a percussively excited fixed-free reed whose first-partial or fundamental vibration coincides in frequency with the fundamental of the respective note, wherein there is employed with each reed a pickup which translates electric oscillations from the fundamental reed vibration, and wherein the mechanico-electric system formed by the pickup and the adjacent portion of the reed is arranged to introduce into the translated oscillations a series of multiple-frequency upper-partial components harmonically related to the fundamental.

As brought out in the patent abovementioned as well as in still earlier applications of mine, the upper-partial free vibrations of a fixed-free reed (i.e., all those above the first-partial or fundamental) inherently tend to be inharmonically related to the fundamental (for a simple rectangular reed the second-partial frequency being 6.27 times the fundamental frequency, the third-partial frequency being 17.55 times that frequency, the fourth-partial frequency 34.39 times that frequency, and so on), so that in the absence of appropriate measures the translated oscillations will contain not only a component of the desired fundamental frequency and the translation-generated series of upper-partial components harmonically related to it, but also inharmonic components respectively translated from the several upper-partial vibrations of the reed (which will include not only components respectively corresponding in frequency to those upper-partial vibrations, but also components which are integral multiples thereof and which are generated in the translation). As further disclosed in that patent, it is highly desirable that there be effected an elimination from the translated oscillations of at least the inharmonic components corresponding to or derived from the second- and third-partial reed vibrations. For that purpose, as to a particular upper partial, that patent disclosed the techniques of eliminating the corresponding inharmonic components either by eliminating that partial vibration itself or by eliminating the translation from it or, though retaining and translating from it, by retuning it to harmonicity with the fundamental.

It is an object of the present invention to provide, in such an electronic piano, a reed in which the returning of the second-partial vibration to harmonicity with the fundamental is achieved in an improved and highly advantageous manner. It is an object to provide improved means and methods for such retuning.

It is an object of the invention to eliminate inharmonic components corresponding to the third-partial vibrations of the reeds in such an electronic piano in an improved manner. It is an object to do so in a manner which at the same time eliminates the inharmonic components corresponding to still-higher-partial vibrations of the reeds.

It is an object of the invention to provide an electronic piano, of the type introductorily referred to, in which the elimination of inharmonic components is achieved by an improved combination of expedients, and in a generally improved and more effective manner. It is an object to provide a generally improved electronic piano of that type.

Other and allied objects will appear from the following brief description, the subsequent detailed description and the appended claims.

I have heretofore (i.e., in an application Serial No. 169,714, filed June 22, 1950 and thereafter abandoned following the filing of a continuation application on which Patent No. 3,038,363 has since been issued) disclosed the provision on the reed of a tuner-damper member, moderately near the fixed end of the reed, whose functions were to reduce the ratio between the frequencies of the second and first partials of the reed's vibration from the normal non-integral value of 6.27 to a lower and integral value, as well as to damp in progressively increasing degrees the reed's vibrations at its progressively higher partials. This expedient, while of considerable effectiveness for its purposes, has certain disadvantages springing from the fact that in order to reduce that inter-partial ratio even to 6, the member must have a sufficient mass (relative to that of the reed) and must be at a sufficiently great distance from the reed's fixed end so that there become substantial its effects on the reed's vibrations at all its partial frequencies, including the first. One of these effects of substantial magnitude on the first-partial vibration is significant reduction of its frequency from that which it would have in the absence of the tuner-damper member. This reduction may of course be approximately allowed for in the original dimensioning of the reed; the result would be that when the member is longitudinally adjusted for the precise integral inter-partial ratio, the first-partial frequency (which is the pitch of the reed and is thus required to be of predetermined value) would be approximately correct—but expecting in a rare fortuitous case it would never be exactly correct, thus requiring a tuning operation on the reed 25 (as by minute filing or loading of its free extremity), which would in turn, affect the inter-partial ratio whose correction would again affect the pitch of the reed, and so on in a "see-saw" of required adjusting and tuning operations.

Another of the effects of substantial magnitude on the first-partial vibration is damping—an effect which, although desired as to higher-partial vibrations, is (other than for bizarre tone qualities) quite undesirable as to the first-partial vibration and the various output tone components translated therefrom. Another effect of substantial magnitude, this one occurring as to the third and each higher partial, is reduction of the ratio of the frequency of that partial to the frequency of the first partial—a reduction which accomplishes no good whatever since it is to an arbitrary non-integral value, and on the other hand is very hurtful in that it renders much lower and audibly more prominent the group of dissonant tone components for which the third and higher partial vibrations of the reed responsible.

According to one aspect of the present invention I again render integral the ratio between the frequencies of the second and first partials, but without significantly damping the first-partial vibration and with no more than a minor reduction of the ratios of the frequencies of third and higher partials to that of the first partial. In rendering integral the firstmentioned ratio I again employ a tuning member, preferably a tuner-damper member, but I do so on a member whose configuration is such that in the member's absence the frequency ratio between second and first partials is only minutely in excess of an integral value (e.g., of 6) so that both the member's mass and its displacement from the reed's fixed end are so small that the longitudinal adjustment of the member for integralization of the frequency ratio occasions essentially imperceptible change of the first-partial frequency—and so small as to achieve the results stated in the preceding sentence.

In my application leading to U.S. Patent 2,942,512 abovementioned I brought out that it was highly desirable to eliminate from the translated oscillations inharmonic components respectively corrresponding to the second and the third partials at which the reed tends to vibrate. The subject matter just discussed accomplishes this desideratum for the second partial by rendering its frequency an integral multiple of that of the first partial, and thus harmonically relating those oscillations which are translated from it to those translated from the first partial. To accompish this desideratum for the third partial there may of course be employed one or another of the techniques disclosed in that patent (i.e., excitation of or translation from the reed at a node for the third partial) or a technique embraced within that disclosed by me in U.S. Patent 2,932,231 (i.e., excitation by a hammer sufficiently soft as to damp out during its contact with the reed any appreciable excitation of the third and higher partials). Each of these techniques, however, imposes some limitation which it may be desired to avoid—e.g., the excitation at the third-partial node or by a soft hammer involves some sacrifice of efficiency of excitation, if not also some lack of pianistic quality at the instant of tone inception, while the translation at the third-partial node involves considerable sacrifice of translation efficiency as well as usually less convenient and conveniently adjustable pickup structures.

According to a further aspect of the present invention the elimination from the translated oscillations of an inharmonic component corresponding to the third partial of the reed's vibration may be accomplished by means comprised not in the mechanical system of reed and hammer (as in the case of excitation at the node or by a soft hammer), nor yet in the mechanico-electric system of pickup and adjustment reed portion (as in the case of translation at the node), but rather in the purely electrical system to which the pick-up is connected. Thus in this system there may be inserted for each pickup or, preferably, for each group of pickups associated with a group of reeds covering a number (for example, six) of consecutive notes of the scale, low-pass filter means which cut off slightly below the third-partial frequency of the lowest included note; this cut-off frequency will remain many times (for example, about 10 times) the first-partial frequency of the highest included note, so that the complement of true harmonics deliberately generated in the translation will not be appreciably reduced.

According to a still further aspect of the invention there is provided, among other things for the achievement of most thoroughly pianistic tones, an electric translation pickup adjacent an edge portion of the reed and comprising a pair of electrodes separated by a narrow gap and means operatively connected with those electrodes for developing a steep electric wavefront of one polarity as that edge portion of the vibrating reed passes from adjacent the first to adjacent the second, and a steep electric wavefront of the opposite polarity as that edge portion passes from adjacent the second to adjacent the first, of those electrodes.

In the detailed description of the invention hereinafter set forth reference is had to the accompanying drawings, in which;

FIGURE 1 is a vertical cross-sectional view of a reed and associated tuner-damper member, hammer and pickup, together with a schematic showing of associated electrical and electro-acoustic apparatus, according to one embodiment of the invention;

FIGURE 2 is a bottom plan view of the reed, tuner-damper member and pickup of FIGURE 1 (as seen for example along the line 2—2 of FIGURE 1);

FIGURE 3 is a vertical cross-sectional view taken along the line 3—3 of FIGURE 1 and showing in particular the tuner-damper member;

FIGURE 4 is an elevational view (excepting for a portion in section) of a reed and associated tuner-damper member and pickup according to another embodiment of the invention;

FIGURE 5 is a bottom plan view of the reed, tuner-damper member and pickup of FIGURE 4 and of adjacent similar elements for a series of notes of the scale (as seen for example along the line 5—5 of FIGURE 4), together with a schematic showing of associated electrical and electro-acoustic apparatus;

FIGURE 6 is an elevational view of the pickup of FIGURE 4 as seen along the line 4—4 of that figure;

Figure 7:
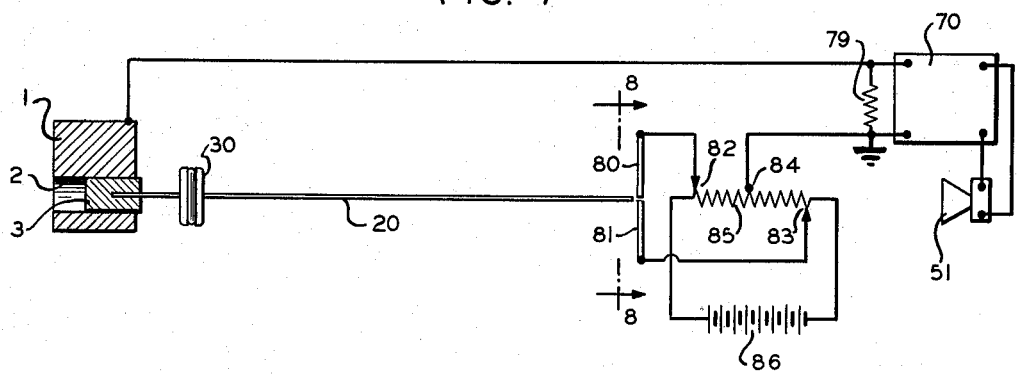
FIGURE 7 is an elevational view (excepting for a portion in section) of a reed and associated tuner-damper member and pick-up, including associated electrical and electro-acoustic apparatus, according to still another embodiment of the invention.

Reference being had to FIGURE 1 there will be seen a metallic reed 20 fixed at its leftshown end portion to a relatively massive metallic base member or rail 1, and otherwise free for vibration. While the fixing of the reed at that end portion may be achieved in any desired manner, I have shown it fixed in a manner generally similar to that shown in U.S. Patent 2,942,512 abovementioned. Thus, that end portion of the reed may be fitted into a longitudinal slot 4 which just freely accommodates it and which is formed in one end of a generally cylindrical plug 3 of deformable metal, and that plug axially force-fitted, its other end first, into a horizontal hole 2 in the base member 1 (the plug having for example been sufficiently tapered toward that other end to facilitate the start of the force fit). This results in a gripping of the entireties of the top and bottom of the reed's end portion whose ridigity is assured by compression of the plug material to a degree determined by the initial dimensioning of the plug; that compression, however, should be limited to that necessary to insure against all slippage or "working" of the reed's end portion within the plug when the main or free portion of the reed is vibrating, since needlessly excessive compressions strain and may even excessively work-harden the reed's end portion and thus invite breakage of the reed at some later time along the plane of its emergence from the plug.

The reed is arranged to be impulsively excited into free vibration, which will inherently be decadent. Such excitation may typically be by a hammer, designated generally as 10, positioned therebelow. The hammer may comprise a head 11, for example of wood generally chisel-shaped but slightly rounded at its extremity, either without or with a covering 12 of felt or other material softer than the wood. The head may be carried at the free extremity of a hammer shank 13 which may for example be of rectangular cross section with the major dimension of that cross section vertically disposed and whose other extremity is secured in a hammer butt 14. That butt may be pivoted as at 16 to a flange 17 which in turn is secured to a suitable fixed wooden rail 18. The hammer may be rocked counterclockwise (as seen in FIGURE 1) about the pivot 16, to propel its head 11 to strike the reed and thus to excite the reed into free vibration, by any suitable means, herein only fractionally illustrated as 15, which will couple the butt to the rear end of a respective playing key (not shown). Such means will of course provide for the ability of the hammer after striking the reed to rebound therefrom and preferably will insure against bounce of the hammer back to the reed even though the playing key remains operated; such provisions are themselves well known (typical ones having been disclosed in U.S. Patent 2,942,512 abovementioned) and need not herein be shown.

If the reed—by which term I here and hereafter (unless otherwise expressly noted) refer to the active or free portion, thus excluding the clamped end portion above described—be a flat uniformly thick one of simple rectangular plan, the ratios of its second- and higher-partial vibration frequencies to its fundamental vibration frequency will be as introductorily set forth above. In accordance with one aspect of the invention I employ a reed which itself has a ratio of second-partial to fundamental vibration frequency modified from the ordinary value of 6.27 to one minutely, but only minutely, more than an integral number— for example to a ratio minutely more than 6. While other techniques (for example longitudinal curving, or helical twisting, of the reed) may be employed to effect such a modification, I have found preferable a tapering of the width of the reed from one of its extremities to the other.

If such tapering be from the free to the fixed extremity (i.e., if the free extremity be wider than the fixed extremity) the ratio under discussion will be raised from its ordinary value of 6.27, while if the tapering be from the fixed to the free extremity the ratio will be lowered, in either case in a degree dependent on the magnitude of that tapering, so that it is in either case possible to choose a degree appropriate to the specification laid down above I prefer to taper the width of the reed from its fixed to its free extremity, and to do so in that modest degree which will render the ratio referred to above minutely more than 6. Such tapering may if desired be effected in one operation for the strips of stock from which a number of reeds will respectively be formed; a number of those strips may for example be stacked face to face, one edge of each up, on a suitable table (for example one which during grinding will hold the reeds in place by magnetic attraction) and their upwardly directed edges ground simultaneously to result in the taper.

The exact taper which will result in the reduction of the ratio to minutely over 6 will best be determined by test for any given stock and approximate reed width; I may, however, give as an example a taper, in a reed approximately 4″ long and .032″ thick, from a width A of about .185″ at its fixed end to a width B of about .155″ at its free end. (It will of course be understood that although it is the dimension of the active or free portion of the reed which is being discussed, the progressive increase of width toward the fixed end will in practice ordinarily be continued throughout the short additional length which will form the clamped end portion.)

The reed itself having a ratio of second-partial to fundamental vibration frequency of minutely more than an integral value such as 6, I employ with it means by which the ratio may be reduced precisely to the integral value. I have heretofore (as mentioned earlier hereinabove) shown that a tuning member carried by the reed may be used to perform the function of changing the ratio under discussion, the theory of its operation being the reduction of both the second-partial and the fundamental frequencies—the former always by a greater proportion than the latter, with the proportion as to each being a function of the distance of the member from the reed's fixed extremity. As heretofore employed, however, with a reed whose second-partial-to-fundamental frequency ratio was 6.27, it has been necessary to use for the tuning member so great a mass (relative to that of the reed) and so great a separation from the reed's fixed extermity (relative to the length of the reed) that it has among other things had a marked effect on the fundamental frequency itself, and its adjustment longitudinally of the reed to render the ratio integral has very markedly shifted that fundamental frequency.

When employed with the reed whose ratio is minutely above an integral value, the tuning member will have a mass small relative to that of the reed and separation from the reed's fixed extremity very small relative to the length of the reed, with the result that the adjustment of the member longitudinally of the reed to integralize the ratio is without appreciable effect on the fundamental frequency of the reed—a result of great importance, for reasons brought out above.

As previously disclosed, the tuning member desirably performs a damping as well as a tuning function. For this purpose it may be a visco-elastic member—i.e., may comprise deformable material, in contact with the reed, which both is elastic, and therefore tends to restore itself from a deformation, and is viscous and therefore absorbs energy in the deformation and restoration. A suitable visco-elastic tuning and damping member is shown in FIGURES 1, 2 and 3, designated generally as 30; it may comprise as its principal element a small toroidally shaped element 31, preferably of neoprene or butyl rubber, surrounding and frictionally engaging the edges of the reed 20. Conveniently the shoulders of the periphery of the element 31 may be rounded, and that periphery may be provided with a central groove 32—the element 31 thus being of "grommet" configuration—and in the groove 32 there may be retained a small metal ring 33 which both contributes in small measure to the mass of the member 30 and also constrains the element 31 against gradual yielding with time.

A tuning and damping member of the type thus described which I have satisfactorily employed has a total mass (including ring 33) of about one-third that of the reed, and has been positioned on the average at about one-eighth of the reed's length from the fixed reed extremity.

The damping function of a member such as 30 will be performed in maximum degree for a partial vibration of the reed which has an anti-node at the point where that member is located. That point being relatively close to the reed's fixed extremity, as seen above, the partial most damped by it will be a relatively high partial (of the order for example of the eighth or higher)—all partials below it being damped by the member 30 in progressively lowering degrees, and that damping of the fundamental (i.e., first partial) being, as is desired, very small indeed.

Of the higher partials the third partial, being lowest in frequency among them, is of most concern. Since it will necessarily remain inharmonic with respect to the fundamental, it is desirable that such oscillations as are translated from it be as little prominent as possible and, in furtherance of that desiratum, as high as possible in frequency. While its frequency will be lowered along with that of the second partial by the member 30, that lowering will be materially less than would result from the integralizing by a tuning member of the ratio between second and first partials in the case of an ordinary flat rectangular reed—and the same is true of still higher partials.

By the term "minutely more" than an integral number I refer to a quantity typically and preferably in excess of that number by a minor fraction of 1% (e.g., if that number be 6, to a quantity in the approximate range of 6.001 to 6.029).

For translating electric oscillations from the reed vibrations there may be used an electric translation pickup suitably associated with the reed. One type of such pickup is of course a capacitive one, wherein an electrode is positioned adjacent a free portion of the reed. In FIGURES 1 and 2 I have shown such a pickup 40 in the form of a small metal plate 41 held for example against the bottom of an insulating tubular pillar 42 by a long screw 43 passing upwardly through plate and pillar into a conductive rail 44, to which latter the plate 41 will be electrically connected by the screw. The plate 41 may be disposed adjacent the edge of the reed 20, for example in a horizontal plane slightly offset vertically from the plane of rest of the reed, so as to be passed by the reed twice in each cycle of the latter's vibration at all excepting very low amplitudes. The pickup (through the rail 44) and the reed (through the base member 1) may be connected to the input terminals of a suitable electronic system 50 which will yield output oscillations (amplified to any desired degree) corresponding to the vibratory variations of the capacity between electrode 41 and the adjacent portion of the reed 20. The electronic system 50, as will be understood (for example, from the disclosure of U.S. Patent 2,942,512 above mentioned), may be arranged to operate on a D.C. basis, on an A.C. amplitude-modulating basis, or on an A.C. frequency-modulating basis; its output may be translated into sound, as by the loudspeaker 51.

The manner in which a pickup such as 40 introduces into the translated oscillations multiple-frequency components harmonically related to the reed vibrations has been set forth in U.S. Patent 2,942,512 abovementioned, and need not here be redetailed.

The second-partial vibration of the reed, seen above to be integrally and therefore harmonically related to the fundamental vibration, has been eliminated as a source of inharmonic components in the translated oscillations; both the direct and the multiple-frequency components translated from it will be harmonically related to the fundamental. Substantial elimination from the translated oscillations of inharmonic components corresponding to the third-partial vibration of the reed may be achieved, if desired, by positioning the pickup 40 (more specifically, its mid-point taken longitudinally of the reed) at that node of the third-partial vibration which lies further from the reed's fixed extremity—i.e., is distant from that extremity by about 13/15 of the reed length. For substantial elimination from the translated oscillations of inharmonic components corresponding to still-higher-partial vibrations of the reed reliance may be placed on progressive limitation of their amplitudes by at least a moderately soft hammer head (e.g., covering 12 above-mentioned) as well as their substantial damping by the member 30—both of which are, of course, in addition to the inherent progressively higher damping, or rate of decay, of those higher-partial vibrations.

In FIGURES 4 and 5 I show an embodiment in which the translating means is of different form, is differently positioned, and does not eliminate inharmonic components corresponding to the third-partial reed vibration, and in which for that elimination other means are employed.

In these figures (from which hammers 10, although contemplated, are omitted for simplicity of illustration) there reappears the reed 20, with its associated tuner-damper member 30, of earlier figures; FIGURE 5 additionally shows in plan, for six notes consecutively higher than that of the reed 20, a respective six other reeds 21 through 26, with respective tuner-damper members each designated as 30. The pickups in this embodiment are electromagnetic ones, each designated generally as 60; they are positioned adjacent the free ends of the respective reeds. Typically each pick-up may comprise a coil 61 having a vertical axis and through which longitudinally pass two flat core members, 62 emerging upwardly and 63 emerging downwardly, in face-to-face relationship within the coil; where it emerges upwardly from the coil the core member 62 may be folded (as illustrated in FIGURE 4, leftwardly) into a horizontal portion which extends far enough to pass the "build" of the coil and is then folded downwardly to form a pole portion 64, and on the other hand where it emerges downwardly from the coil the core member 63 may be similarly folded into a horizontal portion which beyond the coil is folded upwardly to form a pole portion 65. The pole portions 64 and 65 may be in alignment with each other and between their extremities may be formed a relatively narrow gap 66; desirably they will be tapered toward that gap, as illustrated in the vertical elevation of FIGURE 6. Each pickup 60 may be held in any suitable manner with the exposed surface formed by its pole portions 64 and 65 closely beyond the free end of the respective reed, for example with its gap 66 vertically aligned with the plane of rest of that reed.

With respect to each reed and its associated pickup, if a suitable portion of the mechanico-electric system formed by the two—for example the reed itself—be traversed by a maintained magnetic flux, electric oscillations in the form of a voltage within the coil 61 will be translated from the reed vibrations, the fundamental frequency of those oscillations being the fundamental frequency of the reed vibrations. While for this purpose either the reed or one or both of the pickup core members may be permanently magnetized, it is preferable to associate with each reed a separate small permanent magnet, for example one of ceramic material. In FIGURE 4 (but, for simplicity of the drawing, not in FIGURE 5) such a magnet, magnetized either horizontally or vertically, has been shown as 59, supported by any convenient means in rather close spaced relationship to a portion of the reed 20 adjacent its fixed extremity.

In the oscillatory voltages thus translated from the reed vibrations there again occurs a strong development of multiple-frequency components—in this case basically because of the relative abruptness with which the free-end portion of the reed, when the reed is vibrating at any appreciable amplitude, passes across the gap from alignment with some part of the pole portion 64 to alignment with some part of the pole portion 65, and vice versa. The oscillatory voltages may of course be impressed upon the input of an electronic amplifier 70 by connection of the coils 61 thereto; the loudspeaker 51 of earlier figures may be connected to the output of the amplifier.

With the apparatus of FIGURES 4 and 5 inharmonic components corresponding to the third-partial as well as to still-higher-partial vibrations of the reed are eliminated by low-pass filter means 71 interposed in the electrical system which comprises the amplifier 70 and the connections of the coils 61 thereto. With respect to any note the cut-off action of such means should occur at a low enough frequency to suppress effectively the inharmonic component equal in frequency to the frequency of the reed's third-partial vibration, which with the techniques described above may be expected to be of the general order of 15 to 16 times the fundamental frequency; on the other hand it is desirably as high as reasonably convenient while still meeting that specification, in order not to suppress unnecessarily the multiple-frequency harmonic components deliberately generated in the translation. These two specifications can most ideally be met by an individual low-pass filter means for each note; this however becomes elaborate, and little impairment of the harmonic-component development in the output oscillations is suffered if an individual such means be employed for each group of several (for example, six) adjacent notes—the cut-off frequency then being permissibly about 10 times the fundamental of the highest of those notes and about 14 times that of the lowest. Accordingly FIGURE 5 shows a respective low-pass filter means 71 connected across each successive group of six pickup coils 61 (which themselves may be connected in series, preferably in alternately reversed polarities for reduction of their sensitivity to external stray magnetic fields), the outputs of those means being connected in series and across the input of the amplifier 70.

In its simplest variety each low-pass filter means 71 may take the form of a simple shunt capacitor, of a value sufficiently large to effect a substantial attenuation at the frequency of the third-partial vibration of the lowest-frequency reed included in the group for which that means serves. Because of relatively modest sharpness of cut-off, however, this will effect appreciable attenuation of desired harmonic-component development, and for that reason it may be preferred to employ somewhat more elaborate means 71 having a sharper cut-off.

I am aware that low-pass filter means have heretofore been employed in electronic musical instruments to curb excessive harmonic components of higher frequencies; as employed in the present structure, however, they serve the distinct function of suppressing inharmonic components which would otherwise afflict the output tones.

I have found that with the use of the low-pass filter means 71 it is possible to make the hammer-head covering 12 relatively hard, or even to omit it altogether—while still striking the reed at the position found to be most favorable, which is usually in the approximate range of one-sixth to one-quarter of the reed length away from the fixed reed extremity, as distinguished from the reed-mid-point third-partial node—and still to obtain output tones which on the one hand are essentially free of inharmonic components and on the other hand are characterized by an excellent harmonic development. The tones thus obtained are furthermore characterized by excellent pianistic quality at the instant of tone inception—a characteristic which tends to be somewhat militated against by substantial softness of the reed-exciting hammer.

It may be mentioned that in upper regions of the scale the inharmonic components corresponding to the third-partial reed vibrations become so high as to be inherently cut off either by the characteristic of the amplifier 70 or of the loudspeaker 51 or by the inherent characteristic of the listener's ear or have become for other reasons unobjectionable, and that in such regions of the scale the low-pass filter means 71 may of course be omitted.

Considering now in more detail the pickup 60 and its action, it will be appreciated that the pole portions 64 and 65 of its core members 62 and 63 constitute two pole members separated by the narrow gap 66; further, that the first pole member 64, the gap 66 and the second pole member 65 are sequentially disposed transversely to the reed in close spaced relation to the locus of vibration of its free-end edge portion, with the gap substantially aligned with the rest position of the read. Proceeding from this as a starting point, the remainder of the pickup 60 constitutes a means for developing a steep electric wavefront of one polarity as the free-end edge portion of the vibrating reed passes from adjacent the first to adjacent the second pole member, and a steep electric wavefront of the opposite polarity as that edge portion passes from adjacent the second to adjacent the first pole member. It is these steep wavefronts which insure the development in the translated oscillations of a strong complement of multiple-frequency oscillation components.

This structure and action I have found to have certain advantages over such structures as that of FIGURES 1 and 2, wherein a single pole member (i.e., electrode 41) is employed. In such structures the single pole member produces in the translated oscillations an electric wavefront of the same polarity each time the reed passes it, which ever be the direction of that passage; thus the oscillations would be of fundamental frequency doubled with respect to that of the reed, and would contain harmonic partials restricted to even multiples of the reed frequency, unless the pole member were—as it of course is in FIGURES 1 and 2—slightly displaced from alignment with the rest position of the reed to render the single pole member asymmetrically positioned with respect to that rest position. This de-alignment or asymmetry does indeed result in the appearance in the translated oscillations of components corresponding to the fundamental frequency of the reed vibration and of odd multiples thereof. Each of these tends, however, to reach a limiting amplitude at a modest amplitude of reed vibration, with the result that larger-amplitude reed vibrations (resulting from strong excitation of the reed) tend to be deficient in fundamental and odd-multiple components, and with the further result that as the vibration decays from such larger amplitudes those components tends at first not to decay, as they ought to do, along with the decay of the even-multiple components. In the last-mentioned connection it may be mentioned that there frequently occurs the impression that the fundamental, so far from executing the expected decay, actually increases in amplitude through an early portion of the tone.) In a basic view, these actions result from the fact that the relation between the degree of asymmetry (which is a fixed quantity) and the reed vibration amplitude (which is a variable quantity) is necessarily a progressively variable one.

The structure of FIGURES 4 and 5 in no way depends on asymmetry of the pole members with respect to the rest position of the reed, instead developing its fundamental and odd-multiple oscillation components, by reason of the steep wavefronts. It is of course the progressive decrease of the steepness of those wavefronts as the reed vibration amplitude decays that results in the progressively greater decay of the higher-multiple components which is characteristic of piano tone.

The two-pole-member arrangement is not limited to pickups of electromagnetic nature; it may for example be used with pickups of capacitative form, as has been illustrated in FIGURE 7, wherein there reappears the reed 20 and tuner-damper member 30 of earlier figures. Herein the pole members are in the form of two flat electrodes 80 and 81 lying in the same plane and separated by a narrow gap, the sequence formed by the electrode 80, the gap and the electrode 81 being arranged vertically (i.e., transversely of the reed) in close adjacency to the locus of vibration of the free-end edge portion of the reed, in correspondence to the arrangement of 64, 66 and 65 in FIGURE 4.

The two electrodes may be invested with opposite D.C. potentials with respect to ground; these potentials may be derived from a battery 86 across which there is connected a potentiometer 85 having a grounded center-tap 84, the electrode 80 being connected to a slider 82 (shown at one extremity of the potentiometer) and the electrode being connected to another slider 83 (shown at the other extremity). A high resistance 79 may be connected between the reed (via base 1) and ground to complete the typical polarizing circuit, in which it will be understood that oscillations translated from the reed vibrations will appear across the resistance 79 and therefrom may be supplied to amplifier 70 and loudspeaker 51. In this arrangement there will be produced in the translated oscilations a steep electric wavefront of one polarity as the free-end edge portion of the reed passes from adjacent the pole formed by electrode 80 to adjacent that formed by electrode 81, and a steep electric wavefront of the opposite polarity as the reed passes from adjacent 81 to adjacent 80.

Figure 8:
FIGURE 8 is an elevational view of the electrodes of FIGURE 7 as seen along the line 8—8 of that figure.

The electrodes 80 and 81 may each be tapered toward the gap therebetween, as illustrated in FIGURE 8, as were the pole portions 64 and 65 of FIGURE 6. It may be mentioned that in each structure the progressive enlargement of the width proceeding away from the gap tends to compensate for the then-occurring slight enlargement of the spacing from the reed attendant on the slightly curved locus of vibration of its free-end, without necessitating resort to slightly inclining and/or curving the pole members (which could if desired be additionally or alternatively done).

It may be mentioned with respect to the apparatus of FIGURE 7 that one of the sliders 82 and 83, for example the latter, may be movable not merely through the respective half but also through the other half of the length of the potentiometer 84, thus affording the opportunity to shift the tone progressively from the generally preferred one resulting from the oscillations as above discussed toward and ultimately to one in which the lowest component is of double the reed's fundamental frequency and only even multiples of that frequency will be developed as harmonic components.

While I have disclosed my invention in terms of particular embodiments thereof it will be understood that I thereby intend no unnecessary limitations. Modifications in many respects will be suggested by my disclosure to those skilled in the art, and such modifications will not necessarily constitute departures from the spirit of the invention or from its scope, which I undertake to define in the following claims.

I claim:

1. In an electronic piano of the type wherein electric oscillations are translated from the decadent free vibration of a fixed-free reed and wherein multiple-frequency oscillation components harmonically related to that vibration are introduced in that translation into those oscillations, the combination of a fixed-free reed whose free vibration transverse to its length and width comprises a series of different-frequency partial vibrations, the reed in the absence of the tuning member hereinafter recited having a ratio between its second-partial and fundamental vibration frequencies different from an integral number by a fraction only of 1%, impulse-exciting means associated with and effective on the reed for setting it into decadent free transverse vibration, and means, comprising a tuning member of mass small relative to that of the reed, for altering said ratio to said integral number.

2. The subject matter claimed in claim 1 wherein the width of said reed is tapered from one of the extremities of the reed to the other to result in said first-recited ratio.

3. The subject matter claimed in claim 1 wherein the width of said reed is tapered from the secured to the free extremity of the reed to result in said first-recited ratio.

4. The subject matter claimed in claim 1 wherein said integral number is 6.

5. In an electronic piano of the type wherein electric oscillations are translated from the decadent free vibration of a fixed-free reed and wherein multiple-frequency oscillation components harmonically related to that vibration are introduced in that translation into those oscillations, the combination of a fixed-free reed whose free vibration transverse to its length and width comprises a series of different-frequency partial vibrations, the reed in the absence of the tuning and damping member hereinafter recited having a ratio between its second-partial and fundamental vibration frequencies of greater than an integral number by a fraction only of 1%, impulse-exciting means associated with and effective on the reed for setting it into decadent free transverse vibration, and means, comprising a visco-elastic tuning and damping member of mass small relative to that of the reed carried by the reed at a distance from its fixed extremity very small relative to the length of the reed, for reducing said ratio to said integral number without appreciably affecting said fundamental frequency and for increasing the damping of said second and still-higher-partial vibrations without appreciably increasing that of said fundamental vibration.

6. The subject matter claimed in claim 5 wherein the width of said reed is tapered from one of the extremities of the reed to the other to result in said first-recited ratio.

7. The subject matter claimed in claim 5 wherein the width of said reed is tapered from the secured to the free extremity of the reed to result in said first-recited ratio.

8. The subject matter claimed in claim 5 wherein said integral number is 6.

9. In an electronic piano of the type wherein electric oscillations are translated from the decadent free vibration of a fixed-free reed and wherein multiple-frequency oscillation components harmonically related to that vibration are introduced in that translation into those oscillations, the combination of a fixed-free reed whose free vibration transverse to its length and width comprises a series of different-frequency partial vibrations, the reed in the absence of the hereinafter-recited means thereby carried having a ratio between its second-partial and fundamental vibration frequencies different from an integral number by a fraction only of 1% and having non-integral ratios between its respective higher-partial frequencies and its fundamental frequency, impulse-exciting means associated with and effective on the reed for setting it into decadent free transverse vibration, an electric translation pickup associated with and influenced by a free portion of the reed for translating electric oscillations from the reed vibration, means carried by the reed for altering said first-recited ratio to said integral number, and means electrically connected with the pickup for suppressing the oscillations translated from said higher-partial vibrations.

10. In combination in an electronic piano, a mechanical system including a fixed-free reed whose free vibration transverse to its length and width comprises a series of different-frequency partial vibrations having frequencies which tend to be non-integrally related to each other and impulse-exciting means associated with and effective on the reed for setting it into decadent free transverse vibration, a mechanico-electric system consisting of a free portion of the reed and pickup means associated with and influenced by said portion for translating electric oscillations from the reed vibration, an electrical system connected with and fed by the output of said mechanico-electric system, means comprised in said mechanical system for rendering integral the ratio between the second-partial and fundamental vibration frequencies of the reed, means comprised in said mechanico-electric system for introducing into said oscillations multiple-frequency oscillation components harmonically related to the reed vibration, and means comprised in said electrical system for substantially suppressing from said oscillations inharmonic components translated from the third- and higher-partial reed vibrations.

11. In combination in an electronic piano, a fixed-free reed, impulse-exciting means associated with and effective on the reed for setting it into decadent free vibration transverse to its length and width, and an electric translation pickup adjacent tthe reed, said pickup comprising a pair of electrodes separated by a narrow gap, the first electrode, gap and second electrode being sequentially disposed transversely to the reed in close spaced relation to the locus of vibration of an edge portion of the reed and said gap being substantially aligned with the rest position of the reed, and means operatively connected with said electrodes for developing a steep electric wavefront of one polarity as said edge portion of the vibrating reed passes from adjacent the first to adjacent the second, and a steep electric wavefront of the opposite polarity as said edge portion passes from adjacent the second to adjacent the first, of said electrodes.

12. The subject matter claimed in claim 11 wherein said last-recited means comprises means oppositely polarizing said electrodes relative to the reed.

13. The subject matter claimed in claim 1 wherein said ratio in greater than said integral number.

14. The subject matter claimed in claim 1 wherein said ratio is greater than said integral number and wherein said tuning member is carried by the reed at a distance from its fixed extremity very small relative to the length of the reed and reduces said ratio to said integral number without appreciably affecting said fundamental frequency.

(References on following page)

References Cited by the Examiner

UNITED STATES PATENTS

| | | | |
|---|---|---|---|
| 2,254,840 | 9/41 | Demuth | 84—1.15 |
| 2,356,229 | 8/44 | Dunlap et al. | 84—1.15X |
| 2,486,545 | 11/49 | Alvarez | 84—1.15 |
| 2,704,957 | 3/55 | Miessner | 84—1.15 |
| 2,725,779 | 12/55 | Proll | 84—363 X |
| 2,765,693 | 10/56 | Link | 84—363 X |
| 2,834,243 | 5/58 | Miessner | 84—1.14 |
| 2,942,512 | 6/60 | Miessner | 84—1.14 |
| 2,966,821 | 1/61 | Miessner | 84—1.14 |
| 3,007,363 | 11/61 | Miessner | 84—1.04 X |
| 3,038,363 | 6/62 | Miessner | 84—1.04 X |
| 3,154,997 | 11/64 | Bode | 84—363 X |

ARTHUR GAUSS, *Primary Examiner.*

UNITED STATES PATENT OFFICE
CERTIFICATE OF CORRECTION

Patent No. 3,215,765                    November 2, 1965

Benjamin F. Miessner

It is hereby certified that error appears in the above numbered patent requiring correction and that the said Letters Patent should read as corrected below.

Column 1, line 55, for "returning" read -- retuning --; column 2, line 40, strike out "25"; line 59, for "reed responsible" read -- reed are responsible --; column 10, line 13, for "In" read -- (In --.

Signed and sealed this 25th day of October 1966.

(SEAL)

Attest:

ERNEST W. SWIDER                  EDWARD J. BRENNER

Attesting Officer                    Commissioner of Patents